(No Model.)
B. F. JACOBS.
HUB FOR VEHICLE WHEELS.
No. 296,414. Patented Apr. 8, 1884.
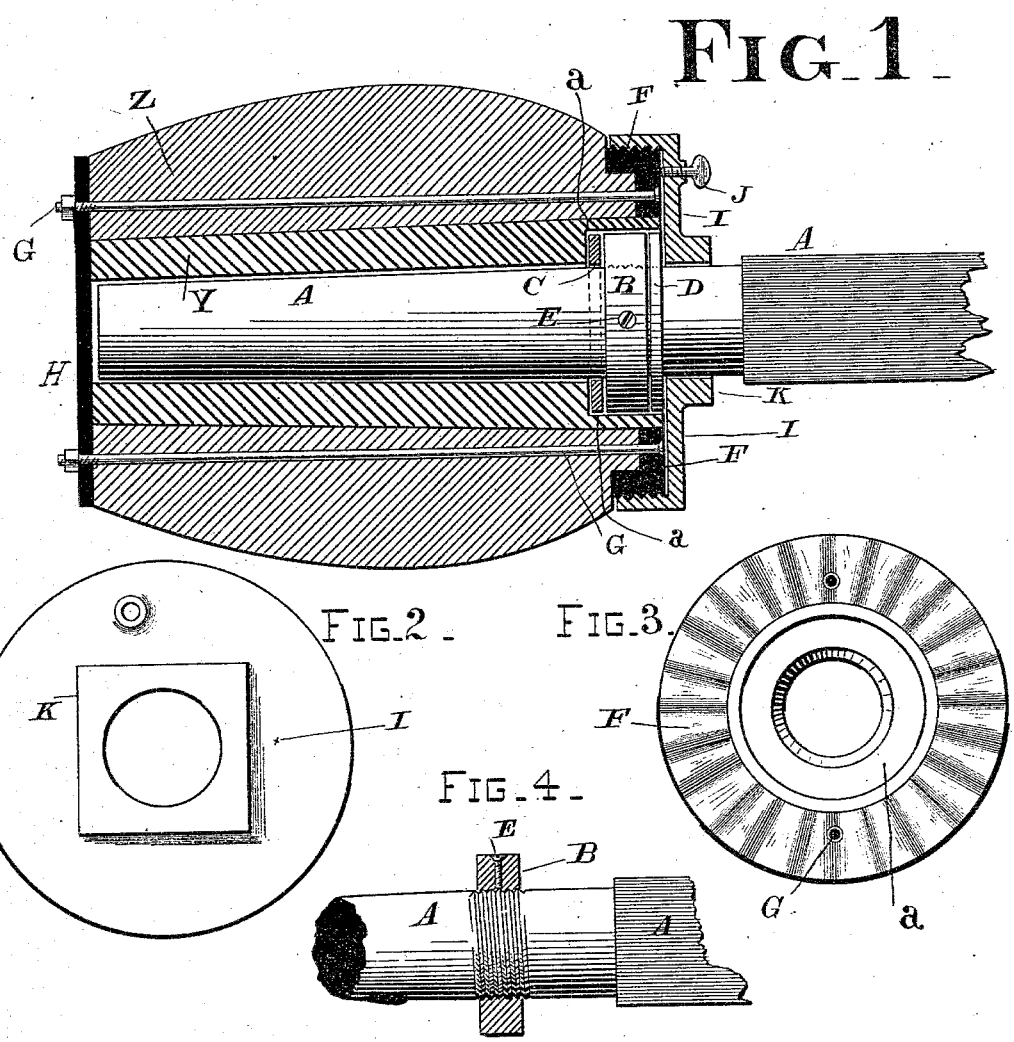
WITNESSES
Wilmer Bradford
A. R. Brown.
INVENTOR
Benjamin F. Jacoby
By C. W. M. Smith
Attorney

UNITED STATES PATENT OFFICE.

BENJAMIN F. JACOBS, OF SAN FRANCISCO, CALIFORNIA.

HUB FOR VEHICLE-WHEELS.

SPECIFICATION forming part of Letters Patent No. 296,414, dated April 8, 1884.

Application filed November 9, 1883. (No model.)

*To all whom it may concern:*

Be it known that I, BENJAMIN F. JACOBS, a citizen of the United States, and residing at San Francisco, in the county of San Francisco and State of California, have invented a new and useful Hub for the Wheels of Vehicles, of which the following is a specification.

My invention relates to an improved hub for vehicle-wheels, the object of my improvement being to provide a vehicle-hub so constructed and arranged as to enable me to dispense with the nut usually employed for retaining the wheel upon the axle, and at the same time retain the wheel in position and prevent its coming off from the axle. This object I accomplish by means of the construction illustrated in the accompanying drawings, in which—

Figure 1 is a central longitudinal section through my improved hub. Fig. 2 is an end view. Fig. 3 is a plan view of the corrugated disk. Fig. 4 is a detail view, showing a portion of the axle and the collar.

Similar letters of reference are used to indicate like parts throughout the several figures.

A represents the axle of a vehicle, having a collar, B, secured upon the spindle near the base thereof.

C and D are washers placed, respectively, to the front and rear of the collar, the washer C resting within and against a rabbet, a, formed in the inner end of the boxing Y of the hub Z. That portion of the spindle upon which the collar is placed is provided with a screw-thread, as shown in Fig. 4, and the collar is first screwed down upon the spindle, and is held in position by the set-screw E. By this construction I am enabled to easily and quickly replace the collar when worn out, and also to use solid washers upon the inner end of the spindle.

Upon the inner end of the hub I place a band or disk, F, having its outer face corrugated, and being held in position and prevented from turning by bolts G G, which extend from the corrugated plate through the hub and through a flat disk, H, upon the outer end of the hub, as clearly shown in Fig. 1. The edge of the corrugated disk F is provided with a screw-thread, over which the retaining plate or cap I is screwed and held in position or prevented from working loose by a set-screw, J, which passes through the face of the disk and engages with the roughened or corrugated surface of the disk F. The retaining-plate I is provided with a squared shoulder, K, for convenience in screwing up or unscrewing the cap or plate by means of a wrench.

When in use, the hub is prevented from working back on the spindle by the collar B coming in contact with the washer C and rabbet a, while at the same time it is prevented from working itself off the spindle by the retaining-plate I coming in contact with the washer D and collar B.

When it becomes necessary to grease the axle, the set-screw J is slackened and the retaining-plate I is unscrewed from the hub, when the hub may be slipped forward on the axle or be removed altogether.

Having thus described my invention, what I claim, and desire to secure by Letters Patent, is—

The combination, with the hub Z, axle A, and rabbeted boxing Y, of the detachable collar B and washers C D, adjustably mounted on said axle, the recessed annular plate F, having a corrugated surface, the disk H, bolts G G, and detachable cap I, substantially as shown and described.

In testimony that I claim the foregoing I have hereunto set my hand and seal.

BENJAMIN F. JACOBS. [L. S.]

Witnesses:
WILMER BRADFORD,
CHAS. E. KELLY.